United States Patent Office 3,848,054
Patented Nov. 12, 1974

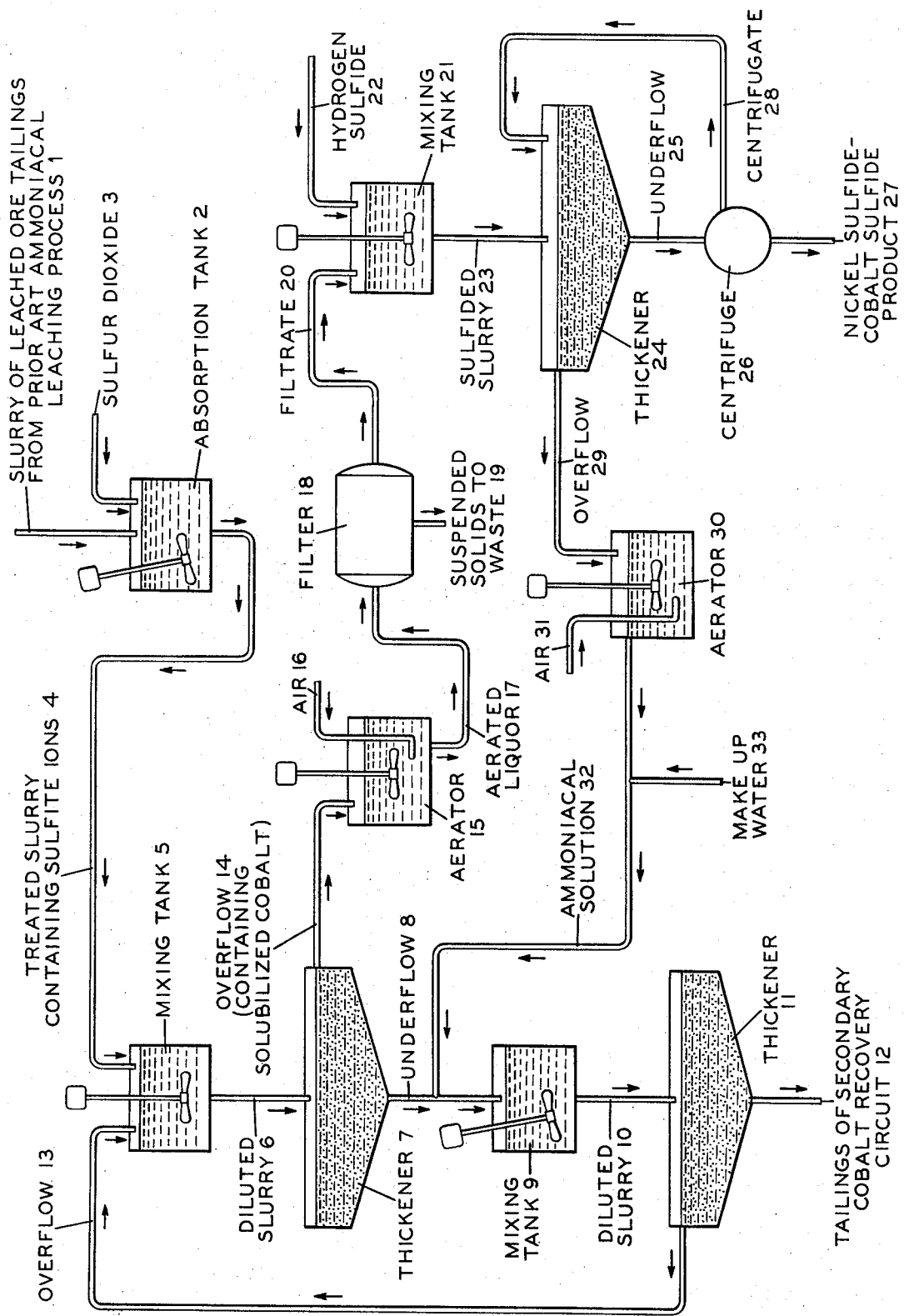

3,848,054
RECOVERY OF COBALT VALUES FROM THE LEACHED ORE TAILINGS OF A CONVENTIONAL AMMONIACAL LEACHING PROCESS
Tadeusz Karol Wiewiorowski, New Orleans, La., assignor to Freeport Minerals Company, New York, N.Y.
Filed June 2, 1972, Ser. No. 259,082
Int. Cl. C01g 1/12, 51/00, 53/00; C22b 3/00, 7/00
U.S. Cl. 423—140
4 Claims

ABSTRACT OF THE DISCLOSURE

Overall cobalt recoveries obtainable from a conventional ammoniacal leaching process for the recovery of non-ferrous metals from reduced nickeliferous ores are significantly improved by the addition of a secondary cobalt recovery circuit in which the leached ore tailings of the process, which are normally discarded to waste with a substanital cobalt content, are treated with an ammoniacal solution in the presence of sulfite ions to recover a substantial portion of the cobalt values present in the tailings.

BACKGROUND OF THE INVENTION

This invention relates generally to the recovery of nickel and cobalt from reduced nickeliferous ores. More particularly, it relates to an improved method which utilizes a unique secondary cobalt recovery circuit for significantly increasing the recovery of such cobalt values, and for recovering the cobalt values in such manner that the recovered cobalt is not associated with large amounts of nickel which can be a disadvantage in isolating the cobalt product.

In recovering the nickel and cobalt values from an ore containing these metals, processes are known in which the ore is first reduced at high temperatures by reducing gases, and then cooled in a non-oxidizing atmosphere. The cooled ore is then subjected to a leaching-washing step in which the reduced ore is first leached with an aqueous ammoniacal solution in the presence of oxygen or an oxygen-containing gas such as air, and then washed in a countercurrent washing circuit with an aqueous ammoniacal solution. When the reduced ore is in contact with the ammoniacal solution, there is formed a slurry in which the reduced ore constitutes the solid phase and the solution the liquid phase. Part of the washing operation entails the separation of this solid phase from the liquid phase containing the recoverable metals, and for this purpose, a series of thickeners is normally used. In most cases, the ammoniacal solution is an aqueous ammonium hydroxide which often also contains ammonium carbonate. A process of this type is commonly referred to as an "ammoniacal leaching process" and is referred to herein by the term "conventional ammoniacal leaching process." Examples of such processes are described in U.S. Pats. No. 1,487,145 and 3,100,700, and in "The Winning of Nickel," J. R. Boldt, Jr., Van Nostrand Co., Inc., Princeton, N.J., 1967, pp. 425–437.

The leaching-washing circuit of these conventional ammoniacal leaching processes yields a pregnant ammoniacal solution containing dissolved nickel and cobalt values, and a slurry of leached ore tailings containing the treated ore. The pregnant solution, normally called the "product liquor," is further processed in order to recover from it the dissolved nickel and cobalt values. It is the common practice to use selective separation techniques such as one or more sulfiding treatments to recover these metals from the product liquor as a mixed precipitate of nickel sulfide and cobalt sulfide. The leached ore tailings of the process are normally discarded to waste.

While these conventional ammoniacal leaching processes provide good overall nickel recoveries (usually between 75% and 95%), the overall cobalt recoveries are poor (usually between 30% and 50%). One reason for this is that substantial amounts of cobalt remain tenaciously associated with the solid phase of the slurry formed when the ore is quenched with the ammoniacal solution, and are eventually lost when this solid phase is discharged to waste with the leached ore tailings of the process.

One prior art method which is said to enhance the overall cobalt recovery in a conventional ammoniacal leaching process is described in U.S. Pat. No. 2,928,732. This method utilizes sulfite ions to improve the extraction of cobalt in the leaching-washing circuit of a conventional ammoniacal leaching process. The method, however, is not without its disadvantages. For example, although the product liquor of such a process contains a high cobalt content because of the thoroughness of the extraction, the nickel sulfide-cobalt sulfide product obtained when this product liquor is sulfided still has a relatively high weight ratio of nickel to cobalt. This ratio can range from about 2.5 to 3 and is only slightly lower than the ratio obtainable from processes which do not use sulfite ions to enhance cobalt extraction. These latter processes typically produce a nickel sulfide-cobalt sulfide product having a nickel to cobalt ratio of about 3. The association with the cobalt of such a large amount of nickel can be a disadvantage to one interested primarily in isolating and recovering the increased cobalt values in the nickel sulfide-cobalt sulfide product. For example, in one known process for isolating the cobalt values, the mixed sulfide product is mixed with water and treated with air at elevated temperatures to oxidize the sulfides to sulfates which dissolve in the water. The aqueous sulfate solution is then treated with an organic solvent containing an extractant which selectively extracts nickel into the organic phase leaving the cobalt in the aqueous phase. If the nickel content of the sulfate solution is high, the use of large amounts of extractant solution are required, a factor which undesirably increases the cost of isolating the cobalt values. Extraction costs remain reasonable if the weight ratio of nickel to cobalt in the mixed precipitate is low, i.e., in the range of about 0.5 to 2, but such costs can increase significantly as this ratio rises above 2. Thus, although the addition of sulfite ions to a conventional ammoniacal leaching process does increase the amount of cobalt which is recovered, it still produces a cobalt product that is associated with undesirably high nickel contents which, from the point of view of one primarily interested in isolating the cobalt values, is a disadvantage.

It is therefore, a general object of this invention to provide a method for significantly enhancing the recovery of cobalt values from reduced nickeliferous ores without the disadvantages associated with prior art methods.

It is another object of this invention to provide a method for recovering cobalt values from reduced nickeliferous ores whereby significantly better cobalt recoveries are achieved than those obtainable from conventional ammoniacal leaching processes and wherein the additional cobalt values recovered are not associated with large amounts of nickel which can add to the expense of isolating the recovered cobalt.

It is another object of this invention to provide a method for recovering those difficult-to-solubilize cobalt values in the ore feed to a conventional ammoniacal leaching process which normally pass through the process without being extracted and are discarded with the ore tailings of the process.

These and other objects of this invention will be apparent to those skilled in the art from a consideration of this entire disclosure.

SUMMARY OF THE INVENTION

The above objectives are accomplished in accordance with the present invention by the use, preferably in conjunction with a conventional ammoniacal leaching process, of a secondary cobalt recovery circuit in which the solid phase of the leached ore tailings of the conventional ammoniacal leaching process is contacted with aqueous ammoniacal solution in the presence of sulfite ions. More specifically, a slurry containing (1) a solid phase which comprises the solids of the leached ore tailings of a conventional ammoniacal leaching process and (2) a liquid phase comprising an aqueous ammoniacal solution having a pH higher than 7, is treated with sulfite ions in an amount sufficient to solubilize cobalt values present in the solid phase of the slurry. The liquid phase of the slurry is normally, but not necessarily, the liquid phase of the leached ore tailings in a conventional ammoniacal leaching process. The treated slurry is then separated into a low solids fraction containing solubilized cobalt values from the tailings and a high solids fraction. This high solids fraction is washed with additional ammoniacal solution to solubilize additional cobalt values and the washed cobalt depleted solids then separated from the ammoniacal wash solution and discarded to waste as the tailings of the secondary recovery circuit of this invention. The ammoniacal wash solution separated from these solids is recycled for mixture with the sulfite ion treated slurry prior to separating the slurry into its low solids and high solids fractions as described above. It is thus seen that the separated low solids fraction of the treated slurry contains at least a portion of this recycled ammoniacal wash solution and the solubilized cobalt values contained therein. The separated low solids fraction of the sulfite ion treated slurry is then treated with a sulfiding agent to recover the solubilized cobalt and nickel values contained therein as a mixed precipitate of cobalt sulfide and nickel sulfide to which the weight ratio of nickel to cobalt is quite low, e.g., on the order of between 0.5 and 2. Cobalt values are isolated from this precipitate of relatively low nickel content in accordance with known procedures.

It has been found that the use of the secondary cobalt recovery circuit of this invention can increase cobalt recoveries by as much as about 30% as compared to most conventional ammoniacal leaching processes.

BRIEF DESCRIPTION OF THE DRAWING

The drawing is a schematic flowsheet illustrating a preferred embodiment of the method of this invention.

DESCRIPTION OF THE PREFERRED EMBODIMENTS

Referring to the drawing, stream 1 represents the leached ore tailings discarded from a conventional ammoniacal leaching process (not shown). The term "leached ore tailings," as used herein, means the slurry that remains after the washing operation has been completed in a conventional ammoniacal leaching process. This slurry is normally the underflow from the last thickener of a conventional ammoniacal leaching process. The leached ore tailings usually comprise from about 5% to 60% by weight of a solid phase in the form of finely divided reduced ore, and from about 40% to 95% of a liquid phase in the form of an aqueous alkaline ammoniacal solution having a pH value higher than 7.

The nickel content of the liquid phase of this slurry is normally so low that additional nickel values cannot be economically recovered by additional washing steps. In fact, the liquid phase of the tailings is normally substantially free from both nickel and cobalt values. The liquid phase illustratively contains between about 0.05 and 0.5 grams of nickel per liter and between about 0.005 and 0.1 grams of cobalt per liter. These values are more typically between about 0.10 and 0.30 for nickel and between about 0.01 and 0.05 for cobalt. This liquid phase normally also contains a considerable amount of ammonia, in the form of ammonium hydroxide and ammonium carbonate, and it is the common practice in the conventional ammoniacal leaching process to recover this ammonia, and reuse it to make up the wash liquor of the process.

The solid phase of the leached ore tailings is normally discharged as waste. Although a substantial amount of the nickel and cobalt values originally present in the solid phase have been removed, the solid phase still illustratively contains, on a dry basis, between about 0.1 to 0.6% by weight nickel and between about 0.02 to 0.15% by weight cobalt, on the same basis. In most cases the solid phase contains between about 0.2 to 0.4% nickel and 0.04 to 0.08% cobalt.

The secondary cobalt recovery circuit of the present invention significantly improves the overall cobalt recovery of a conventional process by recovering a substantial portion of the cobalt values which normally remain tenaciously associated with the solid phase of the leached ore tailings of the process. These cobalt values are completely lost in prior art ammoniacal leaching processes when this solid phase is discharged as waste.

Referring again to the drawing, the slurry of leached ore tailings 1 is subjected to a sulfite ion treatment in absorption tank 2. The sulfite ions can be provided by introducing into the slurry 1 any compound 3 which will impart sulfite ions to the slurry. Thus the compound can be a salt which directly dissociates into sulfite ions upon introduction into the slurry or a material such as sulfur dioxide, which reacts with a component of the slurry (water) to generate sulfite ions *in situ*. Illustratively, any soluble sulfite salt can be employed in the method of this invention. The term "soluble sulfite salt," as used herein, means any sulfite salt having a solubility in water in excess of about 0.1 gram per liter of water at 77° F. Exemplary of such sulfite salts are the ammonium sulfites and ammonium bisulfites such as ammonium sulfite $(NH_4)_2SO_3$ and ammonium bisulfite $NH_4HSO_3$, and the alkali metal sulfites and alkali metal bisulfites, such as sodium sulfite $Na_2SO_3$, sodium bisulfite $NaHSO_3$, and the like. Other sulfite ion source compounds such as sulfur dioxide and sulfurous acid can also be employed. Sulfur dioxide is a preferred source of sulfite ions as shown in the drawing.

The amount of sulfite-providing compound used to treat slurry 1 can vary widely depending on a number of factors, such as, for example, the nature of the compound used. Illustratively, enough compound is introduced into the slurry to provide a sulfite ion content of between about 0.01 and 10, and preferably between about 0.02 and 1 percent by weight, expressed as $SO_2$, of the total weight of slurry treated. The selection of temperatures for the sulfite ion treatment is not critical in the present invention. Illustrative temperatures range from about 50° F. to 200° F. The means for contacting the slurry with the sulfite ion-providing compound can likewise vary widely. It would be possible, for example, to inject the compound which is to provide the sulfite ions directly into stream 1. A contact vessel with provisions for thorough mixing is desirable, however, and illustrative retention times of between about 30 seconds and 24 hours, and preferably between about 1 minute and 3 hours, in such a vessel have been found to be effective for the sulfite ion treatment. The treatment with sulfite ions solubilizes cobalt values associated with the solids of the leached ore tailings into the liquid phase of the slurry.

The treated slurry 4 containing sulfite ions is then fed to a countercurrent washing system where it is washed with an ammoniacal solution 32 which is a recycle stream in the secondary cobalt recovery circuit of this invention, as explained hereinbelow. Thus, treated slurry 4 is blended with overflow 13 from thickener 11 in mixing tank 5 and the resulting diluted slurry 6 is fed to thickener 7. The solids enriched underflow 8 from thickener 7 is blended with ammoniacal solution 32 in mixing tank 9 and the resulting diluted slurry 10 is fed to thickener 11. Solids depleted overflow 13 from thickener 11 is used to dilute slurry 4 in tank 5 as explained above, and the solids enriched underflow 12 represents the tailings of the secondary cobalt recovery circuit. Solids depleted overflow 14 from thickener 7 represents the liquid phase separated by the counter-current washing system, and contains the cobalt values solubilized from stream 1. Thickener 7 could be replaced by two or more countercurrently operated thickeners as long as the ultimate result was to separate slurry 6 into overflow 14 and an underflow 8 for feeding to final thickener 11.

The separated solids depleted overflow 14 is aerated in aerator 15 with an oxygen-containing gas, such as air 16. The aeration can take place in any suitable contact vessel. The aeration of the liquid phase 14 destroys any sulfite ions that might interfere with the sulfiding operation which follows. Enough oxygen-containing gas is provided to oxidize sulfite ions present in the liquor 14 in accordance with the following reaction:

$$SO_3^= + \tfrac{1}{2} O_2 \rightarrow SO_4^=$$

The aerated liquor 17 is filtered 18 to remove suspended solids 19, and the filtrate 20 then fed to mixing tank 21 where it is contacted with a sulfiding agent 22 to precipitate the cobalt values as cobalt sulfide. Any sulfide-providing compound may be used as the sulfiding agent for filtrate. Illustrative compounds include ammonium sulfide $(NH_4)_2$, ammonium hydrosulfide $NH_4HS$, hydrogen sulfide $H_2S$, and the like. Hydrogen sulfide is a preferred sulfiding agent as shown in the drawing. Enough sulfiding agent is used to provide between 100% and 150%, and preferably about 150%, of the stoichiometric amount necessary to convert all of the nickel and cobalt present in filtrate 20 to nickel sulfide and cobalt sulfide, respectively, in accordance with the following reactions:

$$Ni^{++} + H_2S + 2OH^- \rightarrow NiS + 2H_2O$$

$$Co^{++} + H_2S + 2OH^- \rightarrow CoS + 2H_2O$$

The sulfided slurry 23 proceeds to thickener 24 to be separated into a solids enriched underflow 25 and a solids depleted overflow 29. Underflow 25 is fed to centrifuge 26 to produce a mixed nickel-cobalt sulfide enriched underflow 27 representing the recovered cobalt values. Solids depleted centrifugate 28 is returned to thickener 24 for blending with sulfided slurry 23. Overflow from thickener 24 is aerated with an oxygen-containing gas, such as air 31 in aerator 30 to destroy any sulfide ions present. Any suitable contact vessel may be used to aerate overflow 29. Enough oxygen-containing gas is provided to oxidize the sulfide ions present, in accordance with the following reaction:

$$S^= + 2O_2 \rightarrow SO_4^=$$

The resulting aerated stream 32 is an aqueous ammoniacal solution which is then reused as the wash medium for the countercurrent washing system of the secondary cobalt recovery circuit. Make up water 33 can be added to the overflow 29 either before or after it is aerated to compensate for any water losses encountered in the circuit.

Many modifications of the secondary cobalt recovery circuit of the present invention will be apparent to those skilled in the art. For example, the positions in the circuit of aerator tank 15 and filter 18 can be interchanged, and the suspended solids removed from separated liquid phase 14 before liquid 14 is aerated. Or filter 18 can be substituted with other suitable means for separating suspended solids, such as, for example, a settling tank. Or the combination of thickener 24 and centrifuge 26 can be replaced by a filter, or with a combination of a thickener and a filter, or with two thickeners, etc., as long as sulfided slurry 23 is separated into a nickel-cobalt sulfide precipitate 27 and recycle stream 29. These and other modifications are all possible within the judicious choice of those skilled in the art.

The secondary cobalt recovery circuit of this invention is particularly applicable to the treatment of leached ore tailings comprising between 10% and 55% by weight of ore solids, and between 45% and 90% by weight of a liquid phase containing between 1 and 160 grams per liter of ammonium hydroxide, expressed as $NH_3$, and between 1 and 350 grams per liter of ammonium carbonate, expressed as $(NH_4)_2CO_3$. The pH of the liquid phase of the tailings must be higher than 7, or else should be raised to at least 7, and preferably to a value above 8, before the method of the present invention is applied. A preferred technique for raising the pH of the liquid phase of the tailings is by the addition of ammonium hydroxide or ammonium carbonate.

It is an advantage of the present invention that cobalt values present in the product liquor 14 of the secondary recovery circuit of this invention can be conveniently and economically recovered. This is possible because the secondary circuit normally operates on a solids fraction from a conventional ammoniacal leaching process which has been leached and washed and thus is quite depleted in nickel values, and on a liquid phase which is primarily fresh aqueous ammoniacal solution which is substantially free of solubilized nickel. Since the sulfite ion treatment of this invention does not extract significant additional nickel values from the solids of the tailings, the product liquor of the secondary cobalt recovery circuit of this invention has a low nickel-to-cobalt ratio. The cobalt values can thus be conveniently recovered from this liquor by the simple addition of enough sulfide to precipitate virtually all of the cobalt and nickel values. Since there is relatively little nickel available to precipitate, the mixed nickel-cobalt sulfide product thereby produced will have an acceptably low nickel-to-cobalt ratio. This allows the cobalt values to be isolated by oxidation of the sulfides to water soluble sulfates followed by extraction of nickel values from the aqueous sulfate solution without the need and cost of large quantities of the selective nickel extractant, as discussed above. This is in contrast to the case such as that disclosed in U.S. Pat. 2,928,732 where sulfite ions are introduced into the leaching and/or washing steps of the conventional ammoniacal leaching process to enhance cobalt solubilization. In this latter situation, the additional cobalt recovered is intimately associated with a high nickel content.

The low nickel-to-cobalt ratio in the mixed sulfide product from the secondary cobalt recovery circuit can also be used for blending with the mixed sulfide product from the conventional ammoniacal leaching process. This latter product can have a nickel-to-cobalt ratio of anywhere from about 2.5 to 3 as discussed above. In cases where a somewhat lower ratio is desired or required, for example, in order to facilitate isolation of the cobalt values, the product having the 2.5 to 3 ratio can be blended with product from the secondary cobalt recovery circuit having a lower ratio of 0.5 to 2 to produce a composite product whose ratio is lower than that of the product from the conventional ammoniacal leaching process.

It is also a significant advantage that the secondary cobalt recovery circuit of this invention is a separate entity that can function independently from the conventional ammoniacal leaching process. The conventional process can still be operated, if desired, without operating the secondary cobalt recovery circuit. This independent functioning is an operational advantage for several other reasons. For example, the secondary recovery circuit can be used to treat tailings from a conventional ammonical leaching process that have been stored in hold tanks; moreover, the feed rate to the secondary cobalt recovery circuit does not have to match that of the tailings discharged from the conventional ammoniacal leaching process.

The following example is provided to further illustrate the invention:

EXAMPLE

A ground nickeliferous ore containing about 1.5% by weight of nickel and about 0.11% by weight of cobalt was subjected to a conventional ammoniacal leaching process. The ore was fed to a reducing furnace where it was contacted with reducing gases at a temperature between 1,200° and 1,500° F., and then cooled in an indirect heat exchanger to about 300° F. The cooled ore was quenched with an aqueous ammoniacal solution, and the resulting slurry aerated in a series of aerators. The aerated slurry was fed to a thickener to produce a separated overflow containing the recovered solubilized nickel and cobalt values. This separated overflow constituted the product liquor of the conventional process. The underflow from this thickener was washed with an aqueous ammoniacal solution in a countercurrent washing system, using four thickeners. The underflow from the last thickener of this washing system constituted the leached ore tailings of the conventional ammoniacal leaching process.

In Test A of this example, the process just described was operated at a rate of 900 grams per hour of ore fed to the reducing furnace. At this rate, the product liquor of the process, with a specific gravity of about 1.0, was separated at a rate of 1.04 liters per hour, and the leached ore tailings of the process, with a specific gravity of about 1.54, were discharged at a rate of 1.0 liter per hour. The process was operated in this fashion for six consecutive days. It is estimated that from about two to three days were required to approach steady state equilibrium conditions in this system. During the last three days of operation, 11.4 grams per hour of nickel, and 0.41 gram per hour of cobalt were recovered with the product liquor of the process. This represents an overall nickel recovery of 84%, and an overall cobalt recovery of 41%.

In Test B of this Example, the same process as in Test A was operated for six consecutive days, but with the secondary cobalt recovery circuit of the present invention added to process the leached ore tailings from the last thickener of the washing circuit of the conventional ammoniacal leaching process. Again, the main product liquor of the process was separated at a rate of 1.04 liters per hour, and the leached ore tailings flowed at a rate of 1.0 liter per hour. Again, during the last three days of operation, 11.4 grams per hour of nickel, and 0.41 gram per hour of cobalt, were recovered with the main product liquor.

The leached ore tailings 1 of the conventional ammoniacal leaching process were fed to the secondary cobalt recovery circuit illustrated in the accompanying drawing. The tailings were in the form of a slurry having a specific gravity of 1.54 and a solids content of 50% by weight. The finely divided solids contained 0.28% by weight nickel and 0.062% by weight cobalt on a dry basis. The liquid phase of this slurry was an aqueous solution containing 20 grams of ammonium hydroxide, expressed as $NH_3$, per liter of solution, 140 grams of ammonium carbonate, expressed as $(NH_4)_2CO_3$, per liter of solution, 0.24 grams of nickel per liter of solution, and 0.027 grams of cobalt per liter of solution. The pH of the liquid phase was 10 and its specific gravity was 1.0. All streams in the cobalt recovery circuit shown in the drawing were operated at a temperature about 77° F. The flow rates of underflows 8 and 12 from thickeners 7 and 11, respectively, were maintained at 1.0 liter per hour, while the flow rates of overflows 14 and 13 from these thickeners were maintained at 0.77 liter per hour. Sulfur dioxide 3 was introduced into absorption tank 2 at a rate of 0.1 gram of $SO_2$ per 100 grams of leached ore tailings fed to the circuit, i.e., at about 1.54 grams of $SO_2$ per hour. The retention time in tank 2 was 30 minutes. The volume of air injected into aerators 15 and 30 was 1.0 standard cubic foot per hour. Hydrogen sulfide 22 was injected into vessel 21 in an amount equivalent to about 150% of that required to sulfide all of the cobalt and nickel present in filtrate 20. Retention times in thickeners 7 and 11 were 2 hours each, and retention times in aerators 15 and 30, and in sulfiding vessel 21 were 15 minutes each. Make up water 33 was added to compensate for small water losses encountered in the recovery circuit at a rate of 0.77 liter per hour during start-up, and at a rate of about 0.01 liter per hour after stream 32 became available. The cobalt values were recovered in the form of a mixed nickel-cobalt sulfide precipitate 27. Results are shown in Table I below. Stream numbers in Table I refer to those identified in the drawing.

TABLE I

| Stream number | Cobalt content (grams per hour) | | | Nickel content (grams per hour) | | | Flow rate, liters/ hour |
|---|---|---|---|---|---|---|---|
| | Solids | Liquid | Total | Solids | Liquid | Total | |
| 1 | 0.477 | 0.021 | 0.498 | 2.155 | 0.185 | 2.340 | 1.00 |
| 14 | Trace | 0.162 | 0.162 | Trace | 0.146 | 0.146 | 0.77 |
| 27 | 0.161 | | 0.161 | 0.146 | | 0.146 | |
| 12 | 0.293 | 0.044 | 0.337 | 2.080 | 0.114 | 2.194 | 1.00 |

The nickel-and-cobalt content of stream 29 was less than 0.01 gram per liter, indicating practically complete nickel and cobalt removal from stream 14.

It is evident from the data of Table I that the recovered cobalt values of stream 27 originated mainly from the cobalt present in the solid phase of stream 1, since the liquid phase of stream 1 supplied only 0.021 g./hr. of cobalt. Of the 0.498 g./hr. of cobalt flowing into the circuit with stream 1, about 32%, or 0.161 g./hr. of cobalt, was recovered as precipitated sulfide in stream 27. The solids of the feed stream 1 contained 0.062% cobalt while the solids of tailings stream 12 contained 0.038% cobalt, a reduction of more than 38% in cobalt values. The nickel content of the solids processed, on the other hand, was not significantly affected (0.28% in the solids of stream 1 vs. 0.27% in the solids of stream 12). The nickel content of the mixed nickel-cobalt sulfide precipitate 27 originated mainly from the nickel present in the liquid phase of stream 1. It is a significant advantage, as discussed above, that, because the nickel present in the liquid phase of stream 1 was so low, the ratio of nickel to cobalt in the mixed nickel-cobalt sulfide precipitate was also low, i.e., about 1:1.

When the method of the present invention was not used in conjunction with the conventional ammoniacal leaching process, that is, in Test A, the overall cobalt recovery was only 41%. By comparison, when the method of the present invention was used in conjunction with the same conventional ammoniacal leaching process, that is, in Test B, the overall cobalt recovery jumped to 60%. This represents a significant increase of 19% (60% vs. 41%) in overall cobalt recovery, an increased recovery which ordinarily would not be realized since the common practice has been to discard the solids of the leached ore tailings of conventional ammoniacal leaching processes to waste. Overall nickel recovery, on the other hand, remained substantially unaffected.

The detailed and specific information provided in the above example and elsewhere in this disclosure is illustrative only and such alterations and modification thereof which would be apparent to one skilled in the art are considered to fall within the scope and spirit of the claims appended hereto.

What is claimed is:

1. A method for recovering cobalt values present in the leached ore tailings of an ammoniacal leaching process which comprises:
   (a) treating a slurry containing a solid phase comprising the solids fraction of said leached ore tailings containing about 0.02 to 0.15 percent by weight cobalt and about 0.1 to 0.6 percent by weight nickel, and a liquid phase comprising an aqueous ammoniacal solution having a pH above 7, with sulfite ions in an amount sufficient to solubilize cobalt values present in said solid phase into said ammoniacal solution;

(b) blending the treated slurry prepared in step (a) with additional aqueous ammoniacal solution having a pH above 7 to thereby dilute said slurry;

(c) separating the diluted slurry prepared in step (b) into a first stream depleted in solids and a second stream enriched in solids;

(d) treating said first stream prepared in step (c) with an oxygen-containing gas in an amount sufficient to destroy residual sulfite ions present in said first stream;

(e) separating the solid phase of the first stream prepared in step (c) from the liquid phase of said first stream;

(f) treating the solids depleted, gas-treated liquid phase from step (e) with a sulfiding agent in an amount sufficient to precipitate solubilized cobalt and nickel values contained in said liquid phase as a mixed precipitate of cobalt sulfide and nickel sulfide having a nickel to cobalt weight ratio of about 0.5 to 2;

(g) separating the slurry of said liquid phase and cobalt sulfide-nickel sulfide precipitate prepared in step (f), after the precipitation of step (f) is completed, into a first stream depleted in solids and a second stream enriched in solids, and withdrawing said second stream containing the desired cobalt values as cobalt sulfide from the process;

(h) treating the solids depleted first stream prepared in step (g) with an oxygen-containing gas in an amount sufficient to destroy residual sulfide ions present in said first stream;

(i) adding make-up water to said first stream prepared in step (g), when required and mixing said first stream with the second stream prepared in step (c) to thereby dilute said second stream;

(j) separating the diluted stream prepared in step (i) into a first stream depleted in solids and a second stream enriched in solids, said second stream constituting the tailings of said method; and (k) returning the first stream produced in step (j) for blending with the treated slurry prepared in step (a), said returned stream serving as said additional aqueous ammoniacal solution of step (b).

2. The method of claim 1 wherein the quantity of sulfite ions used to treat said slurry in step (a) is between 0.01 and 10% by weight, expressed as $SO_2$, of the total weight of slurry treated.

3. The method of claim 2 wherein said sulfite ions are provided in step (a) by treating said slurry with a compound selected from the group consisting of sulfurous acid, sulfur dioxide and a soluble sulfite salt.

4. The method of claim 1 further including the steps of:
(i) separating the solid phase of the second stream prepared in step (g) from the liquid phase of said second stream, said solid phase containing the desired cobalt values as cobalt sulfide; and
(ii) blending the separated liquid phase prepared in step (i) with the slurry of said liquid phase and cobalt sulfide-nickel sulfide precipitate prepared in step (f) to thereby dilute said slurry.

References Cited

UNITED STATES PATENTS

| | | | |
|---|---|---|---|
| 1,487,145 | 3/1924 | Caron | 423—144 |
| 3,720,750 | 3/1973 | Wiewiorowski et al. | 423—150 |
| 2,928,732 | 2/1960 | Bare et al. | 75—119 |
| 3,716,618 | 2/1973 | Weir et al. | 75—103 |
| 3,227,513 | 1/1966 | Alexa et al. | 75—119 |

FOREIGN PATENTS

| | | | |
|---|---|---|---|
| 854,116 | 10/1970 | Canada | 75—119 |
| 631,939 | 11/1961 | Canada | 75—119 |

OSCAR R. VERTIZ, Primary Examiner

B. E. HEARN, Assistant Examiner

U.S. Cl. X.R.

423—150, 561; 75—103, 119